(12) United States Patent
Grosser et al.

(10) Patent No.: US 8,499,093 B2
(45) Date of Patent: Jul. 30, 2013

(54) METHODS, SYSTEMS, AND COMPUTER READABLE MEDIA FOR STATELESS LOAD BALANCING OF NETWORK TRAFFIC FLOWS

(75) Inventors: Donald B. Grosser, Apex, NC (US); Hood L. Richardson, Jr., Chapel Hill, NC (US)

(73) Assignee: Extreme Networks, Inc., Santa Clara, CA (US)

( * ) Notice: Subject to any disclaimer, the term of this patent is extended or adjusted under 35 U.S.C. 154(b) by 466 days.

(21) Appl. No.: 12/786,152

(22) Filed: May 24, 2010

(65) Prior Publication Data

US 2011/0283013 A1 Nov. 17, 2011

Related U.S. Application Data

(60) Provisional application No. 61/334,724, filed on May 14, 2010.

(51) Int. Cl.
    G06F 15/16 (2006.01)
(52) U.S. Cl.
    USPC .......................................... 709/232; 370/392
(58) Field of Classification Search
    USPC .................................. 709/232; 370/389–427
    See application file for complete search history.

(56) References Cited

U.S. PATENT DOCUMENTS

| | | | |
|---|---|---|---|
| 7,881,208 B1 * | 2/2011 | Nosella et al. | 370/242 |
| 2002/0156612 A1 | 10/2002 | Schulter et al. | |
| 2003/0009559 A1 * | 1/2003 | Ikeda | 709/225 |
| 2004/0078419 A1 * | 4/2004 | Ferrari et al. | 709/201 |
| 2004/0215752 A1 * | 10/2004 | Satapati et al. | 709/223 |
| 2005/0050179 A1 * | 3/2005 | Diehl et al. | 709/221 |
| 2006/0092950 A1 * | 5/2006 | Arregoces et al. | 370/396 |
| 2006/0095969 A1 * | 5/2006 | Portolani et al. | 726/23 |
| 2006/0112170 A1 * | 5/2006 | Sirkin | 709/217 |
| 2009/0016215 A1 | 1/2009 | Nadas et al. | |
| 2009/0073875 A1 | 3/2009 | Kashyap | |
| 2010/0265824 A1 * | 10/2010 | Chao et al. | 370/235 |
| 2010/0302940 A1 * | 12/2010 | Patel et al. | 370/230 |
| 2010/0332664 A1 * | 12/2010 | Yevmenkin et al. | 709/227 |
| 2011/0206047 A1 * | 8/2011 | Donthamsetty et al. | 370/392 |

OTHER PUBLICATIONS

Notification of Transmittal of the International Search Report and the Written Opinion of the International Searching Authority, or the Declaration for International Application No. PCT/US2011/036651 (Jan. 5, 2012).

(Continued)

*Primary Examiner* — Joseph Avellino
*Assistant Examiner* — James Conaway
(74) *Attorney, Agent, or Firm* — Jenkins, Wilson, Taylor & Hunt, P.A.

(57) ABSTRACT

Methods, systems, and computer readable media for performing stateless load balancing of network traffic flows are disclosed. According to one aspect, the subject matter described herein includes a method for performing stateless load balancing of network traffic flows. The method occurs at a layer 3 packet forwarding and layer 2 switching device. The method includes responding to address resolution protocol (ARP) requests from clients, the ARP requests including a virtual IP (VIP) address shared by the device and a plurality of servers coupled to the device, with the medium access control (MAC) address of the device. The method also includes receiving, from the clients, packets addressed to the VIP address and having the MAC address of the device. The method further includes load sharing the packets among the servers using a layer 3 forwarding operation that appears to the clients as a layer 2 switching operation.

28 Claims, 5 Drawing Sheets

OTHER PUBLICATIONS

Carpenter, "Using the IPv6 Flow Label for Equal Cost Multipath Routing in Tunnels," http://tools.ietf.org/html/draft-carpenter-flow-ecmp-00, pp. 1-8 (Jan. 19, 2010).

"GoGo Mode," ExtremeWare 7.2.0 Software User Guide, Extreme Networks, Inc., pp. 188-203 (Dec. 15, 2003).

Khan, "Multicast Equal Cost Multipath (ECMP)," pp. 1-5 (May 30, 2009).

"IP Multicast Load Splitting—Equal Cost Multipath (ECMP) Using S, G and Next Hop," Cisco Systems, Inc., pp. 1-2 (Copyright 2007).

Hopps, "Analysis of an Equal-Cost Multi-Path Algorithm," RFC 2992, pp. 1-9 (Nov. 2000).

Thaler et al., "Multipath Issues in Unicast and.Multicast Next-Hop Selection," RFC 2991, pp. 1-9 (Nov. 2000).

"Equal Cost Multi-Path (ECMP)," GRF Configuration and Management—1.4 Update 2, pp. 2-27-2-31 (Jan. 1998).

\* cited by examiner

| ROUTE TABLE | |
|---|---|
| VIP ADDRESS | ECMP GROUP |
| 192.154.234.2 | LB 1 |
| 192.128.10.2 | LB 2 |
| 192.154.123.2 | LB 3 |
| 192.154.123.12 | LB 4 |
| 192.214.42.3 | LB 5 |
| 192.214.345.6 | LB 6 |
| 153.34.32.12 | LB 7 |
| 42.33.145.6 | LB 8 |

| LB 1 GROUP HASH TABLE | | | | |
|---|---|---|---|---|
| INDEX | PORT | VLAN | MAC | VIP ADDRESS |
| 0 | 42 | 1 | 02-11-34-4E-4B-47 | 192.154.234.2 |
| ⋮ | ⋮ | ⋮ | ⋮ | ⋮ |
| 100 | 42 | 1 | 02-11-34-4E-4B-47 | 192.154.234.2 |
| 101 | 26 | 1 | 10-F3-27-51-22-7A | 192.154.234.2 |
| ⋮ | ⋮ | ⋮ | ⋮ | ⋮ |
| 190 | 26 | 1 | 10-F3-27-51-22-7A | 192.154.234.2 |
| 191 | 44 | 1 | 02-11-34-4E-4B-47 | 192.154.234.2 |
| ⋮ | ⋮ | ⋮ | ⋮ | ⋮ |
| 214 | 44 | 1 | 02-11-34-4E-4B-47 | 192.154.234.2 |
| 215 | 28 | 1 | 10-F3-27-51-22-7A | 192.154.234.2 |
| ⋮ | ⋮ | ⋮ | ⋮ | ⋮ |
| 255 | 28 | 1 | 10-F3-27-51-22-7A | 192.154.234.2 |

FIG. 2

METHODS, SYSTEMS, AND COMPUTER READABLE MEDIA FOR STATELESS LOAD BALANCING OF NETWORK TRAFFIC FLOWS

PRIORITY CLAIM

This application claims the benefit of U.S. Provisional Patent Application Ser. No. 61/334,724, filed May 14, 2010; the disclosure of which is incorporated herein by reference in its entirety.

TECHNICAL FIELD

The subject matter described herein relates to load balancing. More particularly, the subject matter described herein relates to methods, systems, and computer readable media for stateless load balancing of network traffic flows.

BACKGROUND

Load balancing (also referred herein to as server load balancing (SLB)) is a method of distributing workload across a number of devices (e.g., servers) in order to increase productivity. For example, multiple servers may be used to provide services for client nodes, such as computers, mobile phones, etc, in a network. Current implementations of SLB generally fall into 2 main categories: stateful and stateless. Stateful implementations may track and record state (e.g., protocols, ports, addresses, time of day, sequence numbers, packet sizes, duration of flow, etc.) about each network flow (e.g., a stream of related packets) and, as such, can provide the most accurate, granular, and feature-rich load balancing schemes. In particular, stateful implementations may provide content filtering and content aware switching. For example, a stateful load balancer may block certain flows (e.g., based on protocol identifiers or port numbers) from being load balanced and a stateful load balancer may recognize certain events (e.g., a session is established, a timeout has occurred, a session has ended, etc.) or may recognize content (e.g., files being transferred) in flows and, using this state information, may perform appropriate actions (e.g., locking a flow to a particular server for a given application, session, or service). While stateful implementations can provide various features, stateful implementations are generally resource expensive and can suffer from scalability and performance issues.

In contrast, stateless implementations generally are resource inexpensive. Stateless implementations typically distribute traffic using packet-based hashing without storing state or information about each network flow. For example, packet field information (e.g., source Internet protocol (IP) address and destination IP address) may be inputted into a hash scheme for determining which server receives each packet. Since hash values are generally resource inexpensive to compute, these stateless implementations are generally faster and easier to implement. While stateless implementations can provide better performance (e.g., greater packet throughput) than stateful implementations, stateless implementations lack features and have limitations. For example, stateless implementations may lack cookie or session awareness. Additionally, flow persistency in stateless implementations may be generally less reliable. That is, stateless implementations may be generally less consistent in distributing packets of a network traffic flow to the same server. Further, conventional stateless load balancers require restrictive addressing schemes that can limit granularity in assigning load balancing workloads.

Accordingly, a need exists for improved methods, systems, and computer readable media for stateless load balancing of network traffic flows.

SUMMARY

According to one aspect, the subject matter described herein includes a method for performing stateless load balancing of network traffic flows. The method occurs at a layer 3 packet forwarding and layer 2 switching device. The method includes responding to address resolution protocol (ARP) requests from clients, the ARP requests including a virtual IP (VIP) address shared by the device and a plurality of servers coupled to the device, with the medium access control (MAC) address of the device. The method also includes receiving, from the clients, packets addressed to the VIP address and having the MAC address of the device. The method further includes load sharing the packets among the servers using a layer 3 forwarding operation that appears to the clients as a layer 2 switching operation.

According to another aspect, the subject matter described herein includes a layer 3 packet forwarding and layer 2 switching device for performing stateless load balancing of network traffic flows. The layer 3 packet forwarding and layer 2 switching device includes an address resolution protocol (ARP) proxy function for responding to ARP requests from clients, the ARP requests including a virtual IP (VIP) address shared by the device and a plurality of servers coupled to the device, with the medium access control (MAC) address of the device. The layer 3 packet forwarding and layer 2 switching device also includes a load balancing module for receiving, from the clients, packets addressed to the VIP address and having the MAC address of the device and for load sharing the packets among the servers using a layer 3 forwarding operation that appears to the clients as a layer 2 switching operation.

The subject matter described herein for stateless load balancing of network traffic flow may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

FIG. 2 is a diagram of an exemplary layer 3 forwarding table and ECMP data structure according to an embodiment of the subject matter described herein;

DETAILED DESCRIPTION

As used herein, load balancing (also referred to herein as server load balancing (SLB)) refers to sharing, balancing, splitting or otherwise dividing network load or traffic between one or more devices (e.g., servers). As used herein, network load, network traffic, load or traffic refers to packets traveling in, to, or from a network. As used herein, network traffic flows, traffic flows, network flows, flows, and the like refer to one or more related packets traveling in, to, or from a network (e.g., packets in a session, unidirectional stream of packets from or to a source or destination, or packets from or to a particular entity). As used herein, network node, client node, and the like refer to devices for communicating with one or more servers. As used herein, servers refer to any device for providing services or processing messages of the clients. As used herein, layer 2 domain or layer 2 broadcast domain refers to nodes capable of receiving communications using layer 2 addresses (e.g., media access control (MAC) addresses). For example, a layer 2 domain may include nodes within the same physical network or local area network (LAN), e.g., nodes using a same subnet mask, and/or nodes within the same virtual LAN (VLAN).

Figure 1:
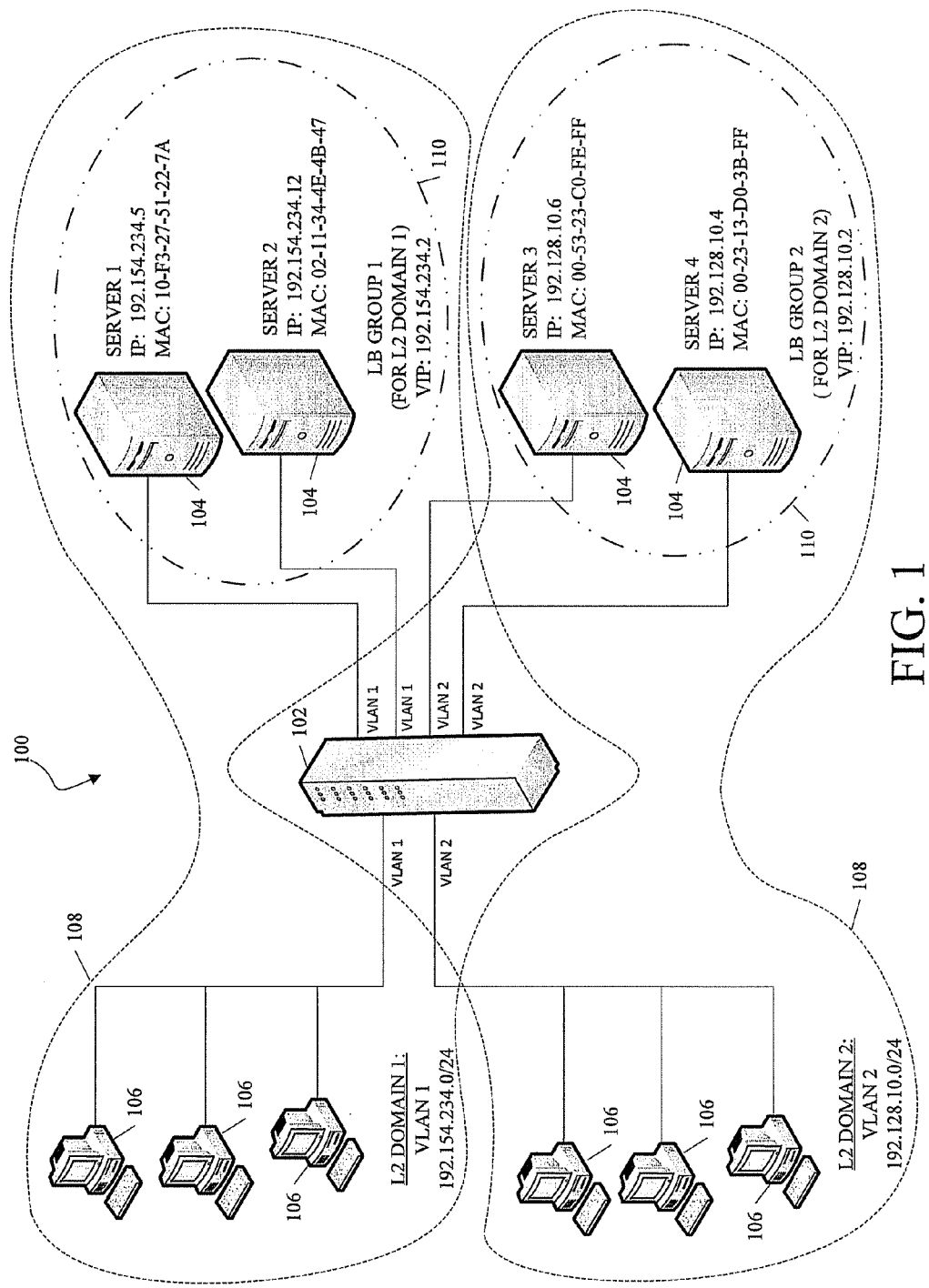
FIG. 1 is a network diagram of an exemplary system for stateless load balancing according to an embodiment of the subject matter described herein.

FIG. 1 is a network diagram of an exemplary system for stateless load balancing. Referring to FIG. 1, network 100 includes a plurality of devices connected together where groups of the devices are in the same VLAN and IP subnet. For example, network 100 may include network devices or clients 106, a layer 3 packet forwarding and layer 2 switching device or L3PF/L2S device 102, and servers 104. Clients 106 and servers 104 may be connected to one or more ports of L3PF/L2S device 102.

In the embodiment shown in FIG. 1, clients 106 and servers 104 are grouped into two layer 2 domains. L3PF/L2S device 102 is grouped into both domains, as L3PF/L2S device 102 is capable of receiving packets from all nodes in FIG. 1. In this embodiment, a layer 2 domain includes nodes that are within the same subnet and the same VLAN. In a second embodiment, a layer 2 domain may include nodes that are within the same physical LAN, e.g., a network represented by nodes with a common subnet mask or nodes connected together either directly or through a single hop (e.g., a L3PF/L2S device 102). In a third embodiment, each layer 2 domain may include nodes that are within the same VLAN but part of different physical LANs.

In FIG. 1, layer 2 domain 1 108 includes a group of client and server nodes having IP addresses within an IP version 4 (v4) address range of 192.154.234.01-192.154.234.254. The nodes of domain 1 108 are associated with VLAN 1. Layer 2 domain 2 108 is a group of client and server having addresses within an IP v4 address range of 192.128.10.01-192.128.10.254. The nodes of domain 2 108 are associated with VLAN 2. In the embodiment shown in FIG. 1, each subnet is associated with a unique VLAN (or VLAN identifier). In a second embodiment, multiple subnets may be associated with one VLAN. In a third embodiment, one subnet may be associated with multiple VLANs.

VLANs allow different physical local area networks to communicate with each other using layer 2 switches, rather than layer 3 routers. Layer 2 switches may be configured to control traffic based on VLAN identifiers. For example, VLANs may be implemented by inserting a VLAN identifier in a layer 2 frame and/or may be implemented based on ports at L3PF/L2S device 102. That is, when layer 2 traffic arrives at L3PF/L2S device 102 at a particular port and/or has a particular VLAN identifier, if a layer 2 forwarding database entry is not present in the forwarding table for the layer 2 traffic, the layer 2 traffic is only flooded onto ports of L3PF/L2S device 102 associated with the same VLAN identifier and/or ingress port. Thus, VLANs are used to control the distribution and flooding of layer 2 traffic. L3PF/L2S device 102 provides packet forwarding between client 106 and servers 104. L3PF/L2S device 102 may provide one or more ports (referred to herein as network-facing ports, network ports, or client ports) for communicating with clients 106 and one or more ports (referred to herein as server-facing ports or server ports) for communicating with servers 104. L3PF/L2S device 102 also provides a load balancing functionality for network traffic flows. In one embodiment, L3PF/L2S device 102 may be configured for using virtual IP addressing and proxy address resolution protocol (ARP) in providing SLB. Additionally, L3PF/L2S device 102 may be configured for using layer 3 functionality, such as ECMP routing hardware or modules, to load balance network traffic flows within a layer 2 domain.

In the embodiment shown in FIG. 1, three clients 106 of domain 1 108 connect to a first network port at L3PF/L2S device 102. As shown, clients 106 of domain 1 108 and the first network port are associated with VLAN 1. Three clients 106 of domain 2 108 connect to a second network port at L3PF/L2S device 102. As shown, clients 106 of domain 2 108 and the second network port are associated with VLAN 2. Servers 104 connect to server ports at L3PF/L2S device 102. In some embodiments, multiple servers 104 may be connected to a single port. In the embodiment shown in FIG. 1, each server 104 is connected to a separate port. Servers 104 and server ports may also be associated with VLANs. In one embodiment, servers 104 are members of the same VLAN. In a second embodiment, servers 104 are members of multiple VLANs. As shown, servers 104 of domain 1 108 and their related server ports are associated with VLAN 1. Servers 104 of domain 2 108 and their related server ports are associated with VLAN 2.

Servers 104 may be organized into load balancing groups 110. For example, a network operator may configure server ports for load balancing network traffic associated with a particular node or groups of nodes (e.g., nodes within a layer 2 domain) via attached servers. In one embodiment, servers 104 may be associated with the same VLAN. To allow greater granularity in assigning load balancing duties, each LB group 110 may be associated with different virtual IP (VIP) addresses. Each VIP address associated with an LB group 110 may be shared by its members (e.g., servers). For example, L3PF/L2S device 102 may configure two LB groups 110 for load balancing network traffic flows associated with VLAN 1. One LB group 110 may be associated a VIP address of 192.154.234.2. A second LB group 110 may be associated a VIP address of 192.128.10.2. Each server 104 of each respective LB group 110 may use a loopback interface configured to receive packets addressed to a particular VIP address (e.g., servers 104 in the first LB group 110 may use 192.154.234.2 and servers in the second LB group 110 may use 192.128.10.2). L3PF/L2S device 102 may use a selection mechanism for load balancing packets addressed to a VIP address. For example, L3PF/L2S device 102 may determine an LB group 110 based on a VIP address within a packet and may determine, using a packet hashing scheme, which server 104 of the LB group 110 is to receive the packet.

In an embodiment where servers 104 are members of multiple VLANs, L3PF/L2S device 102 may perform load sharing on a per-VLAN basis. Load sharing on a per-VLAN basis may include load sharing packets addressed to a VIP address among servers that are members of a particular VLAN. In one embodiment, L3PF/L2S device 102 may configure LB groups 110 with different VIP addresses for different VLANs. For example, L3PF/L2S device 102 may configure two LB groups 110 for load balancing network traffic flows. One LB group 110 may be associated with a VLAN 1 and a VIP address of 192.154.234.2. A second LB group 110 may be associated with a VLAN 2 and a VIP address of 192.128.10.2. In this example, L3PF/L2S device 102 may load share packets addressed to VIP address 192.154.234.2 from clients in VLAN 1 to the first LB group 110 and load share packets addressed to VIP address 192.128.10.2 from clients in VLAN 2 to the second LB group 110. In another embodiment, L3PF/L2S device 102 may configure LB groups 110 with one or more same VIP addresses for different VLANs. For example, L3PF/L2S device 102 may load share packets from client in VLAN1 to the first LB group 110 (or other LB group(s) that share the same VLAN as clients) regardless of which VIP address is used. In a further embodiment, L3PF/L2S device 102 may inform clients (e.g., using an error message or other messages) if packets are addressed to a VIP address associated with a different VLAN.

In one embodiment, each server 104 may be associated with its own unique MAC address and a VIP address shared by servers 104 and switch 102. Servers 104 may also have their own unique IP addresses and VLAN identifiers. In one embodiment, L3PF/L2S device 102 may forward packets addressed to the unique IP address of server 104 without performing load balancing. For example, if packets are addressed to a server using its unique IP address and unique MAC address (e.g., an IP address that is not a VIP address and a MAC address that is not the L3PF/L2S device's MAC address), L3PF/L2S device 102 may use a layer 2 forwarding operation to determine appropriate forwarding information for forwarding the packets to the addressed server.

In the embodiment shown in FIG. 1, LB Group 1 110 includes two servers 104 connected to L3PF/L2S device 102 for processing network traffic of L2 domain 2 108. As shown in LB Group 1 110, server 1 104 has a unique IP v4 address of 192.154.234.5 and a MAC address of 10-F3-27-51-22-7A and server 2 104 has a unique IP v4 address of 192.154.234.12 and a MAC address of 02-11-34-4E-4B-47. LB Group 2 110 includes two servers 104 connected to L3PF/L2S device 102 for processing network traffic of L2 domain 1 108. As shown, in LB Group 2 110, server 3 104 has a unique IP v4 address of 192.128.10.6 and a MAC address of 00-53-23-00-FE-FF and server 4 104 has a unique IP v4 address of 192.128.10.4 and a MAC address of 00-2313-D0-3B-FF.

It is appreciated that IP v4 addresses, VLAN identifiers, and MAC addresses as shown in FIG. 1 represents possible forms of connection information and that other forms may be used. For example, other or additional connection information, such as different IP versions (e.g., IP v6) or additional information from one or more OSI layers (e.g., UDP/TCP port number, application layer information), may be used in stateless load balancing as described herein.

FIG. 2 is a diagram of an exemplary layer 3 ECMP forwarding table and ECMP data structure for performing stateless load balancing according to an embodiment of the subject matter disclosed herein. According to RFC 2991 and 2992, which are incorporated by reference herein in their entireties, ECMP is a routing implementation used by layer 3 forwarding devices or routers to route packets using multiple routes or next hops. Thus, ECMP routing is conventionally used to route packets (e.g., through inter-domain networks) to a same destination (or destination network) using multiple equal cost routes.

According to one aspect of the present subject matter, a layer 2 forwarding device is capable of using layer 3 functionality, such as layer 3 forwarding tables (also referred to herein as layer 3 forwarding databases (FDB)) and ECMP routing hardware, to implement layer 2 switching operations. In one embodiment, a layer 2 forwarding device uses ECMP routing functionality to implement load balancing within a layer 2 domain, such as destinations within a same subnet and a same VLAN. To implement load balancing using ECMP routing functionality, a layer 2 forwarding device may include one or more layer 3 forwarding data structures with LB group information and related forwarding information.

Referring to FIG. 2, load balancing groups and related forwarding information (e.g., next hop information) may be stored in one or more routing lookup tables. Route table 200 represents a data structure (e.g., a forwarding table) for maintaining associations between VIP addresses and LB groups. In one embodiment, LB groups are referred to as ECMP groups. For example, servers of a load balancing group may be equal cost next hops for a packet addressed to a VIP address associated with the load balancing group. ECMP group next hop hash table (NHHT) 202 represents a data structure (e.g., a forwarding table that uses hash values for performing lookups) for maintaining forwarding information associated with servers of an LB or ECMP group.

It will be appreciated that route table 200 and NHHT 202 are one of many possible ways for representing load balancing and related forwarding information. It will further be appreciated that variations in data structures, formats, and usage are possible and contemplated. For example, multiple route tables 200 may be used, such as using one route table 200 for each layer 2 domain. Additionally, multiple NHHTs 202 may be used for representing one or more LB groups. For example, NHHT 202 may include LB groups from one or more networks, VLANs, etc. Further, data structures (e.g., route table 200 and NHHT 202) may include additional information, may be linked or combined (e.g., information in route table 200 and NHHT 202 may be in a single data structure, such as a layer 3 forwarding table or database), and may be at various locations (e.g., at an I/O module at a L3PF/L2S device or in a separate load balancing (LB) module). Route table 200 and NHHT 202 may utilize same or separate hardware resources, such as a first memory and a second memory (e.g., random access memory (RAM)).

In the embodiment shown in FIG. 2, route table 200 and NHHT 202 include load balancing data associated with a layer 2 domain, such as a LAN or VLAN. For example, route table 200 and NHHT 202 may include information about LB groups associated with a particular VLAN. In route table 200, each table entry 204 includes a VIP address and an LB group that is associated with the VIP address. For example, route table 200 shows an entry 204 having a VIP address value of "192.154.234.2" and an ECMP group value of "LB 1". ECMP groups may be associated with one or more VIP addresses. In one embodiment, a VIP address is associated with a single ECMP group. In a second embodiment, a VIP address may be associated with multiple ECMP groups. For example, a VIP address may be associated with two ECMP groups. Depending on additional parameters (e.g., originating IP address, message type, payload type, port number received, etc.), some traffic flows may be handled by the first ECMP group while other traffic flows may be handled by the second ECMP group. In this example, a L3PF/L2S device may use policies for determining which additional parameters are used in making ECMP group determinations.

VIP addresses and/or other parameters may be used in a lookup function for one or more data structures. In the embodiment shown in FIG. 2, VIP addresses may be used as a lookup value for route table 200. Using a VIP address as a lookup value for route table 200, an LB group and/or related forwarding information may be determined, selected, or provided. For example, route table 200 may include links, such as memory pointers or references, to additional data or data structures (e.g., ECMP group field in route table 200 may include references or pointers to one or more data structures (e.g., NHHT 202) that contains forwarding information. In one embodiment, route table 200 includes 32-bit (slash 32) entries (e.g., IP or VIP addresses) pointing to ECMP entries (e.g., NHHT entry 206). In a second example, route table 200 may include forwarding information (e.g., each entry of route table 200 may include next hop information like NHHT 202). In a third example, route table 200 may provide information, such as a key value, for use with other data structures, such as NHHT 202.

In FIG. 2, NHHT 202 provides forwarding information for forwarding packets to servers of LB group (i.e., ECMP group) "LB 1". Forwarding information includes next hop information for forwarding packets towards a destination (e.g., a server). In one embodiment, forwarding information may include a destination MAC address and an egress port (e.g., a port for transmitting packets from L3PF/L2S device 102). Additional related information may also be included. For example, VIP addresses, VLAN identifiers, subnet-related information (e.g., subnet masks), port lists may also be included in NHHT 202.

Forwarding information in NHHT 202 may be indexed for lookup. For example, entries 206 of NHHT 202 may include unique index values for selecting next hop information. In one embodiment, a L3PF/L2S device may select an entry 206 (also referred to herein as a bucket) containing forwarding information (e.g., next hop information) by comparing a computed hash value to index values associated with entries 206 in NHHT 202. Hash values may be produced by inputting packet-related information into one or more hash functions. As used herein, a hash function refers to a mathematical function that converts an amount of potentially variably-sized data (e.g., one or more parameter or field values of a packet) into a smaller data set (e.g., integers) which may be used as indexes into an array or other data structure (e.g., NHHT 202). A hashing implementation may include one or more hash functions. In one embodiment, a hash value is computed with a hashing implementation that uses one or more variables associated with a packet. Variables may include various fields in the packet, such as a source IP address, a destination IP address, layer 3 information, layer 2 information, layer 4 information; SIP information, layer 4 source port, layer 4 destination port, transport control protocol (TCP) port information, user datagram protocol (UDP) port information, and one or more tunneled field parameters.

According to one aspect of the present subject matter, hash values may be used in determining or selecting a server for receiving or processing a given network flow (i.e., related packets). For example, a hash function may use a source and destination addresses and TCP or UDP port information from a packet in computing a hash value. Comparing the hash values to index values in NHHT 202, a bucket is selected containing forwarding information associated with a server. It will be appreciated that a packet-based hash function should generally select the same server for each packet in a network traffic flow, thus providing each network traffic flow to a same server.

In the embodiment shown in FIG. 2, NHHT 202 includes entries 206 containing information related to load balancing servers, such as VIP address and next hop information. Each entry 206 has an index value, an egress port, an egress VLAN identifier, a MAC address, and a VIP address. As shown in NHHT 202, each entry 206 has a unique index value. Each entry also has a same VIP address value of "192.154.234.2" indicating that each server in ECMP group "LB 1" may receive packets addressed to this VIP address. Each entry 206 also has an egress VLAN identifier value of "VLAN 1" indicating that each next hop (e.g., a server of ECMP group) is within the same VLAN. In one embodiment, entries 206 having a same MAC address will also include same values for egress VLAN and egress port. In a second embodiment, entries 206 having a same MAC address may have various values for egress ports or egress VLAN. For example, a L3PF/L2S device may be configured to forward different kinds of traffic through different interfaces of a server. In some embodiments, multiple MAC addresses may use a same egress port or egress VLAN. For example, a server may have multiple MAC addresses. Each MAC address may be for a different interface or for different traffic.

NHHT 202 may include multiple buckets or entries 206. In one embodiment, one or more servers may be associated with multiple entries 206. For example, servers may be weighted to handle a greater or lesser portion of network traffic than other servers of an LB group. As such, a server may be associated with more buckets (i.e., entries 206) if the server is to handle a greater portion of network traffic or the server may be associated with less buckets if the server is to handle a lesser portion of network traffic. In other words, the more entries 206 in NHHT 202 associated with a server generally the more network traffic (e.g., flows) will be forwarded to the server.

Determining weights associated with a server may include using various metrics or variables. In one embodiment, determining weights may be based on computing and network metrics, such as metrics related to bandwidth and computing resources, such as CPU processing speed and memory. Weighting determinations may be dynamic or static. For example, a weight associated with a server may be determining at an initial time based on CPU processing speed and total memory (e.g., RAM) installed at the server. In a second example, weights may be determined periodically or dynamically as availability of resources change (e.g., weights may change if server experiences problems or if network link to server goes down). Since weights may influence number of entries 206 in NHHT 202, entries 206 associated with a server may change. In one embodiment, a L3PF/L2S device may delay or wait to adjust weight of servers so that flow persistence is maintained (i.e., so related packets are not sent to different servers because of entries 206 and hash value associations changing). In one embodiment, a L3PF/L2S device may determine if and when to adjust weights or entries 206. For example, a L3PF/L2S device may adjust weights for all servers when a new server is brought "online" (i.e., configured for load balancing) or when a server becomes unavailable so as to mitigate the number of flows interrupted.

As can be seen from FIG. 2, portions of NHHT 202 are not shown. In particular, vertical ellipses are used for represent entries with a range of index values between index values of adjacent entries 206. In NHHT 202, an index range 208 may include vertical ellipses that are between an entry with an index value of "0" and an entry with an index value of "100".

In this example, the vertical ellipses represent 99 entries each with a unique index value inclusively between 1 and 99.

Each range 208 may be associated with a next hop or destination (e.g., server). As such, entries 206 of a given index range 208 may include redundant (i.e., duplicated) information. In one embodiment, index ranges 208 correspond to server weights. For example, if NHHT 202 has 256 buckets or entries 206 and each entry has a unique index value (e.g., between 0 through 255). A range 208 that includes 101 entries 206, each having the same next hop information and a unique index value (e.g., inclusively between 0 through 100), may generally represent a destination (e.g., server) for receiving 101/256 or over 39% of network traffic directed to a given LB group or VIP address.

While ranges 208 in FIG. 2 represents by entries 206 having the same forwarding information as shown, other ways to represent ranges 208 or duplicate forwarding or next hop information may be used. In one embodiment, a L3PF/L2S device may store unique next hop or forwarding information once (e.g., in a single entry 206 in NHHT 202). Additional entries that are associated with stored forwarding information may include a memory pointer or reference to that information, thereby allowing a forwarding device to efficiently use memory resources and avoid storing identical data multiple times.

Figure 3:
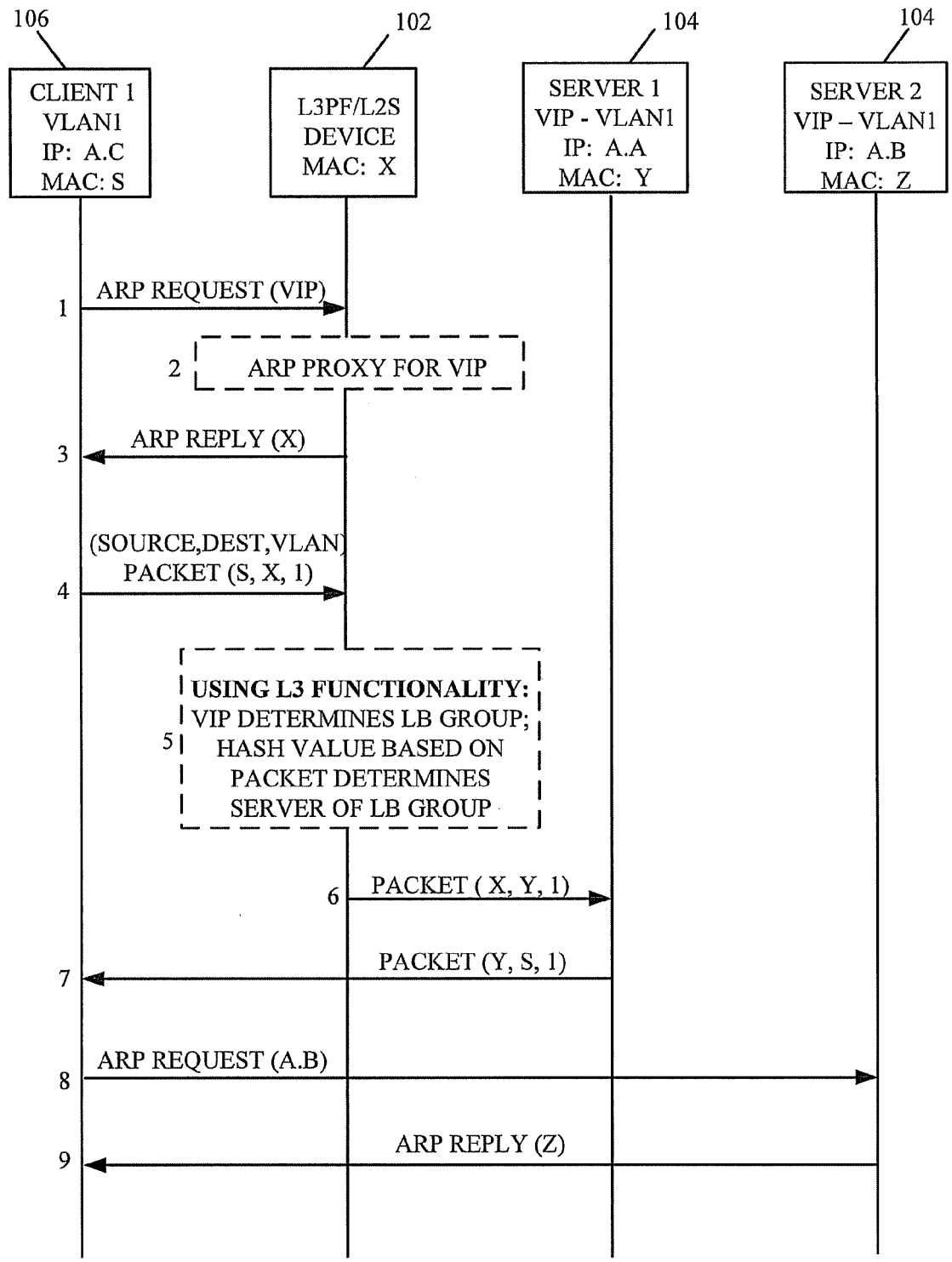
FIG. 3 is a message flow diagram illustrating exemplary messages associated with performing stateless load balancing for network traffic flows.

FIG. 3 is a message flow diagram illustrating exemplary messages associated with performing stateless load balancing for network traffic flows. Referring to FIG. 3, in line 1 of the message flow diagram, client 1 106 formulates an ARP request message for learning a MAC address associated with a VIP address (represented by "VIP" in FIG. 3) and broadcasts the request to nodes within its layer 2 domain (e.g., to nodes within the same subnet and VLAN). In line 2, L3PF/L2S device 102 receives the ARP request. In one embodiment, L3PF/L2S device 102 is configured to act as an ARP proxy for one or more VIP addresses. For example, L3PF/L2S device 102, or software therein (e.g., an operating system (OS)), may use proxy ARP to respond to ARP requests for a VIP address. In line 3, L3PF/L2S device 102 responds to ARP request with an ARP reply containing a MAC address represented by "X" which is the L3PF/L2S device's MAC address and sends the ARP reply to client 1 106. In line 4, client 1 106 formulates a packet addressed to the MAC address of L3PF/L2S device 102 in a destination MAC address field and sends the packet to L3PF/L2S device 102. As shown in FIG. 3, the packet includes a source and destination MAC addresses, represented by "S" and "X" respectively. Additionally, the packet includes a VLAN identifier represented by "1". Though not depicted in FIG. 3, the packet may also include additional information, such as layer 3 and layer 4 information. For example, the packet may include a source IP address field having the IP address of client 1 106 (represented by "A.C") and a destination IP address field having the VIP address (represented by "VIP").

In line 5, the packet is received at L3PF/L2S device 102. L3PF/L2S device 102 may determine how to handle packet. In one embodiment, L3PF/L2S device 102, or software therein, may use triggers or conditions for overriding or refraining from load balancing of packets. For example, L3PF/L2S device 102 may use access control lists (ACLs). If information in related packets matches some ACL criteria, such as a TCP or UDP port number, L3PF/L2S device 102 may forward the flow to a particular server 104 or handle the packets in a particular way (e.g., discard suspicious or unauthenticated packets). In a second example, L3PF/L2S device 102 may refrain from load balancing packets if the packets are not addressed to a VIP address (or if the packet is not addressed to the MAC address of L3PF/L2S device 102). If the packet is not to be load balanced, L3PF/L2S device 102 may forward the packet to the port corresponding to the destination address in L3PF/L2S device's forwarding table.

If the packet is to be load balanced (e.g., the destination MAC address of the packet is the same as the MAC address of L3PF/L2S device 102 or a packet's destination IP address is a VIP address), L3PF/L2S device 102 may use layer 3 functionality, such as ECMP routing tables and related hardware, in performing load sharing, or a portion therein. In one embodiment, ECMP routing hardware may be used in implementing a selection algorithm for determining a server 104 for receiving the packet. To determine an appropriate server 104, L3PF/L2S device 102 may examine the packet for a VIP address. If a VIP address is found, the VIP address may be used to determine a group of servers for performing load balancing. For example, a VIP address may be used as a lookup value in a layer 3 data structure (e.g., a route table 200, as illustrated in FIG. 2) containing associations between VIP addresses and ECMP groups (i.e., LB groups).

Hash values based on packet information may determine a server 104 and related forwarding information for forwarding the packet to the server 104. In one embodiment, hash functions (e.g., ECMP hash functions or schemes as disclosed in RFC 2991) may be used in computing a same hash value for related packets. For example, a hash value may be computed by inputting particular fields of packet (e.g., a source and destination address). The hash value may be compared to index values of a data structure (e.g., a NHHT) with forwarding information. If an index match is found (e.g., a hash value matches the index of a bucket associated with server 1 104), the forwarding information in the entry may be used. As stated above, L3PF/L2S device 102 should generally compute a same hash value for related packets, thereby providing a network traffic flow to a same server 104 without needing to store state information for the flows.

In line 6, L3PF/L2S device 102 modifies the packet to include forwarding information associated with server 1 104 and forwards the packet to the server 1 104. For example, L3PF/L2S device 102 may use forwarding information of server 1 104 from a NHHT. L3PF/L2S device 102 may replace a destination MAC address field of the packet with the unique MAC address of server 1 104. L3PF/L2S device 102 may also replace a source MAC address field of the packet with the MAC address of L3PF/L2S device 102. Additionally, an egress VLAN field of the packet may be replaced with the VLAN identifier associated with server 1 104. In FIG. 3, it will be appreciated that the VLAN identifier is replaced with a same value since the packet is being forwarded within the same domain.

As shown in FIG. 3, the packet includes a destination MAC address (represented by "Y") associated with server 1 104 and a source MAC address (represented by "X") of the L3PF/L2S device 102. In line 7, server 1 104 receives the packet and processes the packet accordingly. In line 8, server 1 104 formulates a packet in response to the received packet and transmits it towards client 1 106 (e.g., the packet may be transmitted towards client 1 106 via the port it was received at server 1 104). In one embodiment, the response packet may include a source MAC address field having the unique MAC address of server 1 104. The client 106 may then address additional related packets (e.g., packets in the same network traffic flow) to the server using the server's MAC address. L3PF/L2S device 102 may perform direct server forwarding (e.g., forwarding a packet to a client-requested server 104 using layer 2 forwarding database without using a load balancing algorithm) if a packet is addressed to a unique MAC address of a server 104. In a second embodiment, the response packet may include the MAC address of L3PF/L2S device 102 in the source MAC address field.

In the embodiment shown in FIG. 3, the response packet includes a source and destination MAC addresses, represented by "Y" and "S" respectively. Additionally, the response packet includes a VLAN identifier represented by "1". Though not depicted in FIG. 3, the packet may also include additional information, such as layer 3 and layer 4 information. For example, the packet may include a source IP address field with the VIP address (represented by "VIP") and a destination IP address field with the IP address of client 1 106 (represented by "A.C").

In line 8, client 1 106 formulates an ARP request message for learning a MAC address associated with an IP address of server 2 104 (represented by 'A.B") and broadcasts the request to nodes within its layer 2 domain (e.g., its physical LAN or VLAN). L3PF/L2S device 102 receives the ARP request and forwards the packet towards server 2 104. While L3PF/L2S device 102 has functionality for performing proxy ARP for layer 3 addresses, such as VIP addresses, L3PF/L2S device 102 may forward ARP requests of layer 3 addresses that are not configured for proxy ARP without sending a reply. In other words, ARP requests to all non-VIP addresses, such as IP address of server 2 104, may be passed through the L3PF/L2S device at layer 2 towards its destination. For example, L3PF/L2S device 102 may forward an ARP request towards a destination using a layer 2 forwarding table or may broadcast the ARP request to a layer 2 domain if the destination is not learned.

Figure 4:
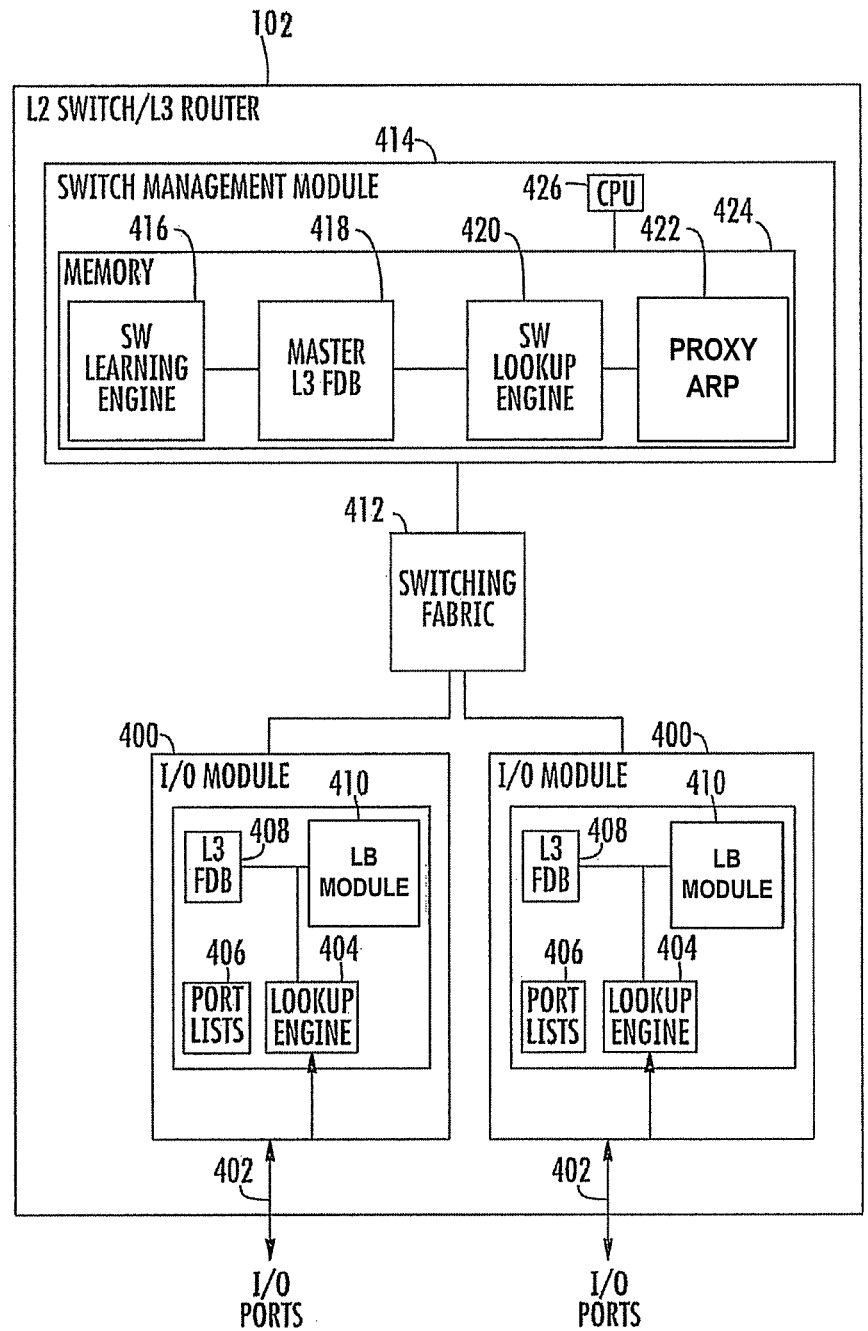
FIG. 4 is a block diagram of an exemplary internal architecture of a layer 2 forwarding device with layer 3 functionality for performing stateless load balancing described herein.

FIG. 4 is a block diagram of an exemplary forwarding device suitable for stateless load balancing according to an embodiment of the subject matter described herein. It is appreciated that while the layer 3 packet forwarding and layer 2 switching device shown in FIG. 4 represents one possible implementation of a forwarding device suitable for stateless load balancing, the subject matter described herein can be implemented using other forwarding devices. An example of a commercially available packet forwarding device suitable for use with embodiments of the subject matter described herein is the Summit® X450 series switch available from Extreme Networks of Santa Clara, Calif.

Referring to FIG. 4, L3PF/L2S device 102 may perform stateless load balancing using modules implemented in hardware, firmware, and/or software. For example, L3PF/L2S device 102 may include a plurality of input/output (I/O) modules 400 for sending and receiving packets. I/O modules 400 may each include one or more I/O ports 402 for connecting to an external network. In one embodiment, each I/O module 400 may include a lookup engine 404, a port lists (and/or next hop) data structure 406, and one or more layer 3 forwarding databases 408. Port lists data structure 406 includes port identifiers for forwarding packets towards a destination. In one embodiment, next hop information (e.g., as shown in NHHT 202 in FIG. 2) associated with load balancing servers may be included with port list information. Layer 3 forwarding database 408 may include VIP addresses and associated ECMP group data. In one embodiment, Layer 3 forwarding database 408 may also include next hop information (e.g., as shown in NHHT 202 in FIG. 2). Lookup engine 404 may perform lookups in database 408 based on VIP addresses to determine a matching ECMP group in next hop data structure 406.

Load balancing (LB) module 410 may provide functionality for load balancing packets among a group of servers. In one embodiment, LB module 410 may include an ECMP routing module for use in stateless load balancing. LB module 410 may determine a LB group (e.g., an ECMP group) for a given packet. Additionally, LB module 410 may determine which server in the LB group to forward the packet and functionality for forwarding the packet using the associated next hop information. In particular, module 410 may include a hashing implementation for computing hash values used in selecting servers for load balancing network traffic flows. Module 410 may also include functionality for modifying packets with next hop information and forwarding packets toward appropriate servers (e.g., via egress ports as disclosed in data structure 406). In an alternate implementation, LB module 410 may include one or more layer 3 modules or components, e.g., module 410 may include components or modules, such as lookup tables and data structures, that are depicted separately in FIG. 4.

Although a single lookup engine 404 is depicted in FIG. 4 for performing layer 3 forwarding lookups, the subject matter described herein is not limited to such an implementation. For example, additional tables, lookup engines, and other components, may be included. In particular, a layer 2 forwarding database or related modules may be present for performing normal (i.e., non-load balancing layer 2 switching operations.

Switching fabric 412 switches packets between I/O modules 400 and switch management module 414. Switch management module 414 may include layer 3 software learning engine 416, a master layer 3 forwarding database 418, a software lookup engine 420, and a proxy ARP function 422. The switch management module 414, and its components therein (e.g., software learning engine 416, a master layer 3 forwarding database 418, a software lookup engine 420, and proxy ARP function 422), may be stored in memory 424 and executed by CPU 426. Switch management module 414 may include software (e.g., an operating system) for performing health-checking of servers and components and other functionality for allowing stateless load balancing at layer 2 via layer 3 modules (e.g., an LB module).

Learning engine 416 may include routing protocol software for exchanging routing protocol information with other nodes. Therefore, learning engine 416 may add learned entries to master software FDB 418. Learning engine 416, or other module, may use one or more protocols (e.g., Internet control message protocol (ICMP), ARP, etc.) or may attempt to connect to applications or services at servers for health checking purposes. For example, using a control-path protocol such as ICMP (e.g., to send a ping command), L3PF/L2S device 102 may determine whether servers are available or unavailable for load balancing purposes. Based on this determination, L3PF/L2S device 102 may bring servers "online" or "offline".

Master layer 3 forwarding database 418 may include a copy of all of the entries in hardware-based layer 3 forwarding databases 408 maintained by I/O modules 400 as well as any additional entries learned using layer 3 routing protocols implemented by software 416. Software lookup engine 420 may perform lookups in master layer 3 forwarding database 418 for packets received by I/O modules 400 that cannot be forwarded using the layer 3 forwarding data maintained locally by each I/O module ("slowpath" processing). As mentioned above, it is desirable to limit the amount of "slowpath" processing for packets performed by lookup engine 420 by conserving port list hardware resources 406.

Proxy ARP function 422 may provide functionality for responding to ARP requests from clients, the ARP requests including a virtual IP (VIP) address shared by the device and a plurality of servers coupled to the device, with the medium access control (MAC) address of the device. For example, proxy ARP function 422 may include functionality to examine each ARP request received for a VIP address and reply with its own MAC address (i.e., the MAC address of the L3PF/L2S device 102) if ARP requests include a VIP address.

Figure 5:
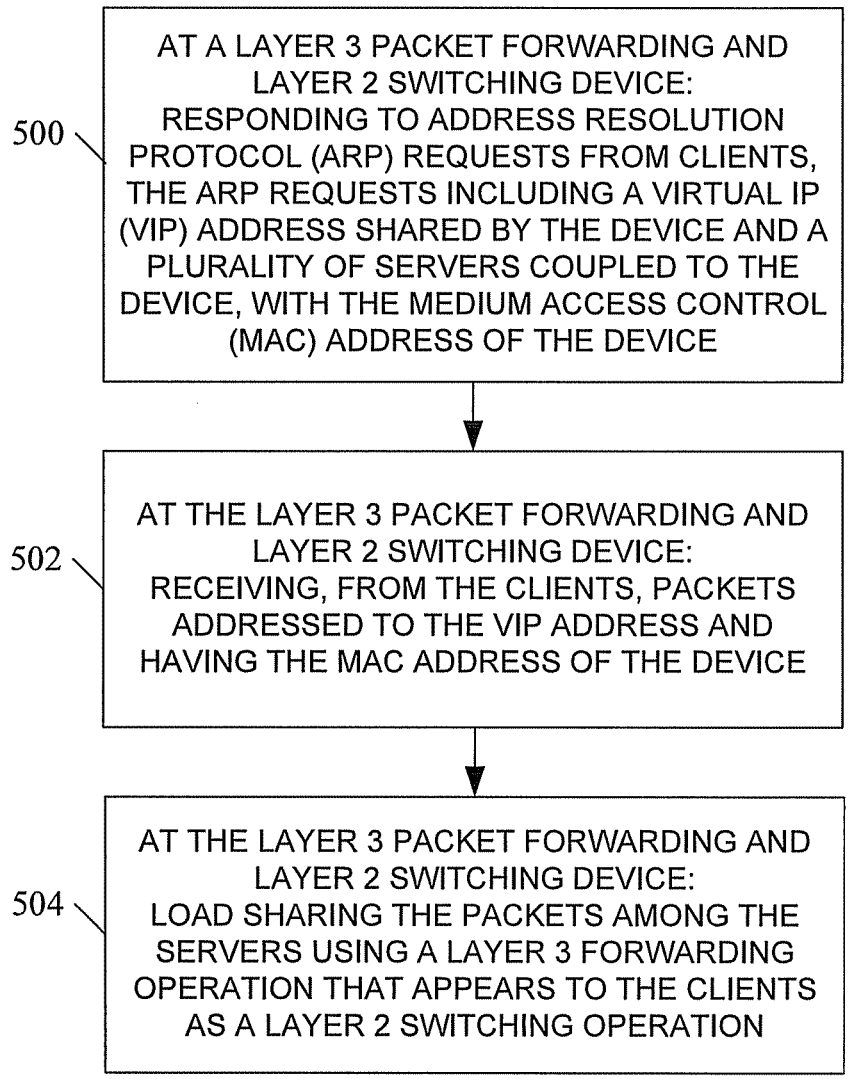
FIG. 5 is a flow chart of an exemplary process for performing stateless load balancing of network traffic flows according to an embodiment of the subject matter described herein.

FIG. 5 is a flow chart of an exemplary process for performing stateless load balancing of network traffic flows according to an embodiment of the subject matter described herein. Exemplary process may occur at a layer 3 packet forwarding and layer 2 switching device (e.g., a layer 2 switch that includes a LB module). Referring to FIG. 5, at step 500, the layer 3 packet forwarding and layer 2 switching device responds to address resolution protocol (ARP) requests from clients, the ARP requests including a virtual IP (VIP) address shared by the device and a plurality of servers coupled to the device, with the medium access control (MAC) address of the device. For example, client nodes may broadcast an ARP request for a VIP address. The layer 3 packet forwarding and layer 2 switching device may be configured to acknowledge ARP requests for a VIP with replies containing its MAC address.

At step 502, the layer 3 packet forwarding and layer 2 switching device receives, from the clients, packets addressed to the VIP address and having the MAC address of the device. For example, client nodes within the same subnet as a VIP address and associated with the same VLAN may formulate packets addressed to the VIP address that includes the forwarding device's MAC address as the packet's destination MAC address. The client nodes may have received the L3PF/L2S device's MAC address in response to sending an ARP request for the VIP address.

At step 504, layer 3 packet forwarding and layer 2 switching device load shares the packets among the servers using a layer 3 forwarding operation that appears to the clients as a layer 2 switching operation. In one embodiment, a layer 3 forwarding operation may appear to the clients or network as a layer 2 switching operation because the packets, from the client nodes, to be load shared are being forwarded to server nodes that are or appear to be in the same layer 2 domain as the client nodes. For example, packets that are addressed to and from nodes within a same physical and/or virtual LAN (e.g., origination and destination nodes within the same subnet and the same VLAN) may appear to be layer 2 switched at a network or client level.

It will be appreciated that while packet delivery within a layer 2 domain appears as a layer 2 switch operation to the clients, the 3 packet forwarding and layer 2 switching device may be configured to use layer 3 forwarding functionality for load balancing purposes. For example, the 3 packet forwarding and layer 2 switching device may use an LB module for transmitting packets to load balancing servers associated with a VIP address. In one embodiment, performing a layer 2 switching operation on the packet includes performing, using the VIP address, a lookup on one or more layer 3 forwarding databases to determine a load balancing group for selecting next hop information. After performing a hash on the packet (e.g., inputting one or more packet fields into a hash function and outputting a hash value), the hash value is used in determining or selecting a server of the load balancing group for receiving the packet. The packet may be modified with next hop information associated with the selected server and the packet may be forwarded towards the destination for processing. It will be appreciated that related packets (e.g., packets in the same network traffic flow) should generate the same hash value and, as such, should be forwarded to the same server. Thus, forwarding packets of the same network traffic flow to the same server may be performed without storing state information for the flows and the 3 packet forwarding and layer 2 switching device may use layer 3 forwarding functionality (e.g., an ECMP routing module) for stateless load balancing of network traffic flows.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for performing stateless load balancing of network traffic flows, the method comprising:
at a layer 3 packet forwarding and layer 2 switching device:
responding to address resolution protocol (ARP) requests from clients, the ARP requests including a virtual IP (VIP) address shared by the device and a plurality of servers coupled to the device, with the medium access control (MAC) address of the device;
receiving, from the clients, packets addressed to the VIP address and having the MAC address of the device; and
load sharing the packets among the servers using a layer 3 forwarding operation that appears to the clients as a layer 2 switching operation by performing the layer 3 forwarding operation based on the MAC address received from the client.

2. The method of claim 1 wherein load sharing the packets using a layer 3 forwarding operation comprises:
determining an equal cost multipath (ECMP) group corresponding to the VIP address and load sharing the packets among servers in the ECMP group.

3. The method of claim 1 wherein the servers have different MAC addresses.

4. The method of claim 1 wherein the servers are members of the same virtual local area network (VLAN).

5. The method of claim 1 wherein the servers are members of different virtual local area networks (VLANs) and wherein the layer 3 packet forwarding and layer 2 switching device is configured to perform the load sharing on a per-VLAN basis using different VIP addresses for different VLANs.

6. The method of claim 1 comprising forwarding packets of the same network traffic flow to the same server without storing state information for the flows.

7. The method of claim 1 wherein the layer 3 packet forwarding and layer 2 switching device is configured to actively check the status of the servers and to update load sharing information based on the status.

8. The method of claim 1 wherein packets addressed to an individual server are forwarded by the layer 3 packet forwarding and layer 2 switching device to the server without performing load sharing.

9. The method of claim 1 wherein the layer 3 packet forwarding and layer 2 switching device configures network-facing ports and server-facing ports into a single VLAN.

10. The method of claim 1 wherein the layer 3 packet forwarding and layer 2 switching device configures network-facing ports and server-facing ports into multiple VLANs, wherein each VLAN includes one or more network-facing ports and one or more server-facing ports.

11. The method of claim 1 wherein the servers receive amounts of network traffic corresponding to weights associated with the servers.

12. The method of claim 11 wherein the weights are determined using on one or more factors, the factors comprising central processing unit (CPU) resources, memory resources, and availability of resources relative to other servers.

13. The method of claim 1 wherein load sharing the packets using a layer 3 forwarding operation comprises accessing an equal cost multipath (ECMP) routing table using parameters in the packets to perform the load sharing.

14. The method of claim 1 wherein the IP packet forwarding device uses access control lists (ACLs) in determining whether to load balance network traffic flows.

15. A layer 3 packet forwarding and layer 2 switching device for performing stateless load balancing, the device comprising:
a processor; and
a memory storing instructions, which when executed by the processor implement;
a proxy address resolution protocol (ARP) function for responding to ARP requests from clients, the ARP requests including a virtual IP (VIP) address shared by the device and a plurality of servers coupled to the device, with the medium access control (MAC) address of the device; and
a load balancing module for receiving, from the clients, packets addressed to the VIP address and having the MAC address of the device and for load sharing the packets among the servers using a layer 3 forwarding operation that appears to the clients as a layer 2 switching operation by performing the layer 3 forwarding operation based on the MAC address received from the client.

16. The device of claim 15 wherein the servers have different MAC addresses.

17. The device of claim 15 wherein the servers are members of the same virtual local area network (VLAN).

18. The device of claim 15 wherein the servers are members of different virtual local area networks (VLANs) and wherein the load balancing module is configured to perform the load sharing on a per-VLAN basis using different VIP addresses for different VLANs.

19. The device of claim 15 wherein the load balancing module is configured to forward packets of the same network traffic flow to the same server without storing state information for the flows.

20. The device of claim 15 wherein the device is configured to actively check the status of the servers and to update load sharing information based on the status.

21. The device of claim 15 wherein the device is configured to forward packets addressed to an individual server without performing load sharing.

22. The device of claim 15 wherein the device is configured to group network-facing ports and server-facing ports into a single VLAN.

23. The device of claim 15 wherein device is configured to group network-facing ports and server-facing ports into multiple VLANs, wherein each VLAN includes one or more network-facing ports and one or more server-facing ports.

24. The device of claim 15 wherein the load balancing module is configured to load share packets among servers corresponding to weights associated with the servers.

25. The device of claim 24 wherein the weights are determined using or more factors, the factors comprising central processing unit (CPU) resources, memory resources, and availability of resources relative to other servers.

26. The device of claim 15 wherein the load balancing module is configured to access an equal cost multipath (ECMP) routing table using parameters in the packets to perform the load sharing.

27. The device of claim 15 comprising:
access control lists (ACLs) for use in determining whether to load balance network traffic flows.

28. A non-transitory computer readable medium containing a computer program including computer executable instructions that when executed by the processor of a computer perform steps comprising:
at a layer 3 packet forwarding and layer 2 switching device:
responding to an address resolution protocol (ARP) request from clients, the ARP request including a virtual IP (VIP) address shared by the device and a plurality of servers coupled to the device with the medium access control (MAC) address of the device;
receiving, from the clients, packets addressed to the VIP address and having the MAC address of the device; and
load sharing the packets among the servers using a layer 3 forwarding operation that appears to the clients as a layer 2 switching operation by performing the layer 3 forwarding operation based on the MAC address received from the client.

* * * * *